United States Patent
Huang et al.

(10) Patent No.: US 8,912,813 B2
(45) Date of Patent: Dec. 16, 2014

(54) TEST DEVICE FOR LIQUID CRYSTAL DISPLAY DEVICE AND TEST METHOD THEREOF

(75) Inventors: Xianjun Huang, Shanghai (CN); Jian Zhao, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 373 days.

(21) Appl. No.: 13/325,991

(22) Filed: Dec. 14, 2011

(65) Prior Publication Data

US 2012/0169346 A1    Jul. 5, 2012

(30) Foreign Application Priority Data

Dec. 31, 2010 (CN) .......................... 2010 1 0619936

(51) Int. Cl.
- *G01R 31/26* (2014.01)
- *G02F 1/13* (2006.01)
- *G02F 1/1362* (2006.01)
- *G09G 3/00* (2006.01)

(52) U.S. Cl.
CPC ............... *G02F 1/13* (2013.01); *G02F 1/1309* (2013.01); *G02F 1/1362* (2013.01); *G09G 3/006* (2013.01)
USPC .................................................. 324/760.01

(58) Field of Classification Search
CPC ................ G02F 1/1309; G02F 1/1362; G02F 1/136204; G02F 1/13; G09G 3/006
USPC ......... 324/760.01–760.02, 414; 349/149–152
See application file for complete search history.

(56) References Cited

U.S. PATENT DOCUMENTS

| | | | |
|---|---|---|---|
| 7,336,093 B2 * | 2/2008 | Uei et al. | 324/760.01 |
| 2009/0180046 A1 * | 7/2009 | Yang et al. | 349/55 |
| 2010/0109693 A1 * | 5/2010 | Lee | 324/755 |
| 2010/0127258 A1 * | 5/2010 | Kang et al. | 257/48 |
| 2010/0141293 A1 * | 6/2010 | Chen et al. | 324/770 |
| 2010/0213969 A1 * | 8/2010 | Kim | 324/770 |

FOREIGN PATENT DOCUMENTS

| | | |
|---|---|---|
| CN | 1527104 A | 9/2004 |
| CN | 101303462 A | 11/2008 |
| CN | 101364022 A | 2/2009 |
| CN | 201413440 Y | 2/2010 |
| TW | 200728824 A | 8/2007 |
| TW | 357609 U | 5/2009 |

* cited by examiner

*Primary Examiner* — Patrick Assouad
*Assistant Examiner* — Demetrius Pretlow
(74) *Attorney, Agent, or Firm* — Kilpatrick Townsend & Stockton LLP

(57) ABSTRACT

A test device for a liquid crystal display device includes a first shorting bar, a first, a second and a third control line, transmission lines and thin film transistor switch elements; in which the gate electrodes of thin film transistor switch element are respectively arranged on the first, the second and the third control line; the data lines are respectively connected to the first, the second and the third control line via the drain electrodes of thin film transistor switch elements, in which data lines for controlling the blue pixel units are connected to the first control line, data lines for controlling the red pixel units are connected to the second control line, data lines for controlling the green pixel units are connected to the third control line; and the source electrodes of multiple thin film transistor switch elements are connected to the first shorting bar via multiple transmission lines.

15 Claims, 5 Drawing Sheets

TEST DEVICE FOR LIQUID CRYSTAL DISPLAY DEVICE AND TEST METHOD THEREOF

FIELD OF THE INVENTION

This application claims the benefit of China Patent Application No. 201010619936.4 filed on Dec. 31, 2010. The disclosure of the above application is incorporated herein by reference.

The present invention relates to the field of semiconductor integrated circuit technique, and particularly to a test device for a liquid crystal display device and a test method thereof.

BACKGROUND OF THE INVENTION

A liquid crystal display device has an active display portion composed of a pixel matrix. The active display portion includes: multiple scanning lines extending in the row direction of the pixel matrix, multiple data lines (also referred to as signal lines) extending in the column direction of the pixel matrix, switch elements arranged near intersecting portions of the scanning lines and the data lines, and pixel electrodes connected with the switch elements. The scanning lines and the data lines extend to the periphery portion of the active display portion, so as to detect the quality of an image displayed on the active display portion by inputting the test signal at the periphery portion.

In the prior art, a detection device such as a shorting bar, is usually arranged at the periphery portion, and a test signal is inputted on the shorting bar and is transmitted to the scanning line or the data line in the active display portion via corresponding elements, to detect the quality of the image displayed on the active display portion.

Referring to FIG. 1, FIG. 1 is a structural schematic diagram of a detection device of a liquid crystal display device in the prior art. In FIG. 1, 101, 102, 103, 109 denote four shorting bars; 104, 105, 106 and 110 denote test terminals respectively connected to the shorting bars 101, 102, 103, 109, and test signals are inputted on the test terminals and then transmitted to the data lines and the scanning lines via the shorting bars. D1, D2, D3, D4, D5, D6 denote six data lines, C1, C2, C3, C4, C5, C6 denotes six transmission lines. The shorting bar 101 is connected with the transmission line C1 through a via hole 107, and then the transmission line C1 is connected with the data line D1 through a Thin Film Transistor (TFT) switch 108. If a test signal is inputted on the test terminal 104, the test signal is transmitted to the data line D1 via the shorting bar 101, the via hole 107, the transmission line C1 and the thin film transistor switch 108. Similarly, other data lines can receive test signals via their corresponding test terminal, shorting bar, via hole, transmission line and thin film transistor switch. In FIG. 1, G1, G2 and G3 denote three scanning lines, the shorting bar 109 is connected with a thin film transistor switch 111 via a transmission line C7, and the thin film transistor switch 111 is connected with the scanning line G3 via the transmission line 108 and a via hole 112. If a test signal is input on the test terminal 110, the test signal is transmitted to the scanning line G3 via the shorting bar 109, the transmission line C7, the thin film transistor switch 111, the transmission line C8 and the via hole 112. Similarly, other scanning lines can obtain test signals via their corresponding test terminal, shorting bar, transmission line, thin film transistor switch and via hole.

During manufacture of the liquid crystal display device, larger static electricity in the processes such as glass taking and placing, oriented film coating and orientation rubbing, will cause a conductive film (the material of which is Indium Tin Oxide (ITO) or Indium Zinc Oxide (IZO)) at a via hole for connecting the transmission line and the shorting bar to be burned. Therefore, there is line defect in the data line direction or in the scanning line direction when the liquid crystal display device is tested, which will affect the final test results.

SUMMARY OF THE INVENTION

In view of this, the present invention provides a test device for a liquid crystal display device and a test method thereof. In the test device for a liquid crystal display device, the via holes are eliminated to avoid the effect of via holes on test result during testing process.

To achieve the above objective, the present invention provides a technical solution as follows:

a test device for a liquid crystal display device, in which the liquid crystal display device includes multiple scanning lines and multiple data lines that intersect perpendicularly, and multiple pixel units defined by the multiple scanning lines and the multiple data lines, and the pixel units includes red pixel units, green pixel units and blue pixel units;

the test device includes a data line test means, wherein the data line test means comprises a first shorting bar, a first control line, a second control line, a third control line, multiple transmission lines and multiple thin film transistor switch elements; wherein the gate electrodes of the multiple thin film transistor switch elements of the data line test means are respectively arranged on the first control line, the second control line and the third control line;

the multiple data lines are respectively connected to the first control line, the second control line and the third control line via the drain electrodes of the thin film transistor switch elements, wherein all the data lines for controlling the blue pixel units are connected to the first control line, and all the data lines for controlling the red pixel units are connected to the second control line, and all the data lines for controlling the green pixel units are connected to the third control line; and the source electrodes of the multiple thin film transistor switch elements of the data line test means are respectively connected to the first shorting bar via the multiple transmission lines.

Optionally, three thin film transistor switch elements of the data line test means, which are connected with the data lines of three adjacent pixel units, have the source electrodes connected to the first shorting bar via a same transmission line.

Optionally, the three adjacent pixel units are the red pixel unit, the green pixel unit and the blue pixel unit adjacent with each other.

Optionally, the test device for a liquid crystal display device also includes a scanning line test means including a second shorting bar, a fourth control line, multiple transmission lines and multiple switch elements, wherein the gate electrodes of the multiple thin film transistor switch elements of the scanning line test means are arranged on the fourth control line; and the multiple scanning lines are connected to the fourth control line respectively via the drain electrodes of the thin film transistor switch elements of the scanning line test means, and the source electrodes of the multiple thin film transistor switch elements of the scanning line test means are connected to the second shorting bar respectively via multiple transmission lines.

Optionally, the test device for a crystal liquid display device also includes a scanning line test means including a second shorting bar, multiple transmission lines and multiple thin film transistor switch elements, wherein the gate electrodes of the multiple thin film transistor switch elements of the scanning line test means are respectively arranged on the first control line, the second control line and the third control line; and the drain electrode of one thin film transistor switch element of the scanning line test means on the first control line, the drain electrode of one thin film transistor switch element of the scanning line test means on the second control line, and the drain electrode of one thin film transistor switch element of the scanning line test means on the third control line are connected to a same scanning line, and the source electrodes of which are connected to the second shorting bar via a same transmission line.

Optionally, the width of the second control line at an intersecting portion of the second control line and the data line is smaller than the width of the second control line at non-intersecting portion.

Optionally, the test device for a liquid crystal display device also includes a test terminal connected to the first control line, a test terminal connected to the second control line and a test terminal connected to the third control line.

Optionally, the test device for a liquid crystal display device also includes a test terminal connected to the first shorting bar.

Optionally, the first shorting bar, the source electrodes and the drain electrodes of the multiple thin film transistor switch elements of the data line test means, and the multiple data lines are made of a same material, and are formed synchronously.

Optionally, the test device for a liquid crystal display device also includes a test terminal connected to the second shorting bar.

Optionally, the drain electrodes of the multiple thin film transistor switch elements of the scanning line test means are connected to the scanning lines by via holes, respectively.

Optionally, the test device for a liquid crystal display device also includes a test terminal connected to the fourth control line.

Optionally, the first shorting bar, the second shorting bar, the source electrodes and the drain electrodes of the multiple thin film transistor switch elements of the scanning line test means, and the multiple data lines are made of a same material, and are formed synchronously.

The present invention provides a first test method including:

Step S1: providing a control signal of a high voltage respectively for the fourth control line and the second shorting bar of the scanning line test means in the test device;

Step S2: providing a control signal of a high voltage respectively for the first control line, the second control line and the third control line in the test device;

Step S3: providing a voltage signal for the first shorting bar in the test device to insert a white image; and Step S4: displaying images with different colors to detect a defect by adjusting the voltage signal on the first shorting bar in the test device and adjusting the control signals on the first control line, the second control line and the third control line in the test device.

The present invention provides a second test method, including:

Step S1: providing a control signal of a high voltage respectively for the first control line, the second control line, the third control line and the second shorting bar in the detection device;

Step S2: providing a voltage signal for the first shorting bar in the detection device to insert a white image; and Step S3: displaying images with different colors to detect a defect by adjusting the voltage signal on the first shorting bar in the detection device, and adjusting the control signals on the first control line, the second control line and the third control line in the detection device.

It can be seen from the above technical solution that, in the detection device of a liquid crystal display device provided by the present invention, the via hole between the transmission line and the shorting bar is eliminated according to the design, which eliminates line defects of the data lines or the scanning lines caused by via holes during the testing process, and thus eliminates the effect of the via holes on the test results.

In addition, the detection device of a liquid crystal display device provided by the present invention saves space for the test portion, which facilitates the production of a small size liquid crystal display device. Also, the saved space can be used for the increase of size of a thin film transistor switch, such that the thin film transistor switch has a larger ON state current thus improving display characteristics.

BRIEF DESCRIPTION OF THE DRAWINGS

Hereinafter, the drawings which are referred to in description of the following embodiments will be briefly introduced so as to explain the embodiments of the present disclosure more clearly. Apparently, the drawings described below are merely the embodiments of the present invention, and other drawings may be obtained by those skilled in the art based on these drawings without any creative work.

DETAILED DESCRIPTION OF THE INVENTION

To make the above object, features and advantages of the present invention more obvious and easy to be understood, in the following, particular embodiments of the present invention will be illustrated in detail in conjunction with the drawings.

More specific details will be set forth in the following descriptions for sufficient understanding of the disclosure, however the present invention can also be implemented by other ways different from the way described herein, similar extensions can be made by those skilled in the art without departing from the spirit of the present invention, therefore the present invention is not limited to particular embodiments disclosed hereinafter.

In addition, the present invention is described in conjunction with the schematic drawings. When describing the embodiments of the present invention in detail, for ease of illustration, sectional views showing the structure of the device are enlarged partially on the usual scale, and the views are only examples, which should not be understood as limiting the protection scope of the present invention. Furthermore, in an actual manufacture process, three-dimensional space sizes, i.e. length, width and depth should be considered.

A First Embodiment

As stated in the background of the present invention, in the manufacturing process of a liquid crystal display device, larger static electricity will usually cause the conductive film at the via hole connecting the transmission line and the shorting bar to be burned, so as to produce the line defect of the data lines or scanning lines, thus affecting the final test result. The applicant has found according to the research that the essence reason causing the above phenomenon is that, shorting bars and transmission lines are formed in different steps in the prior art, therefore via holes are required to connect the shorting bars and the transmission lines, and thus the test results are affected in the testing process due to defects of via holes.

Figure 2:
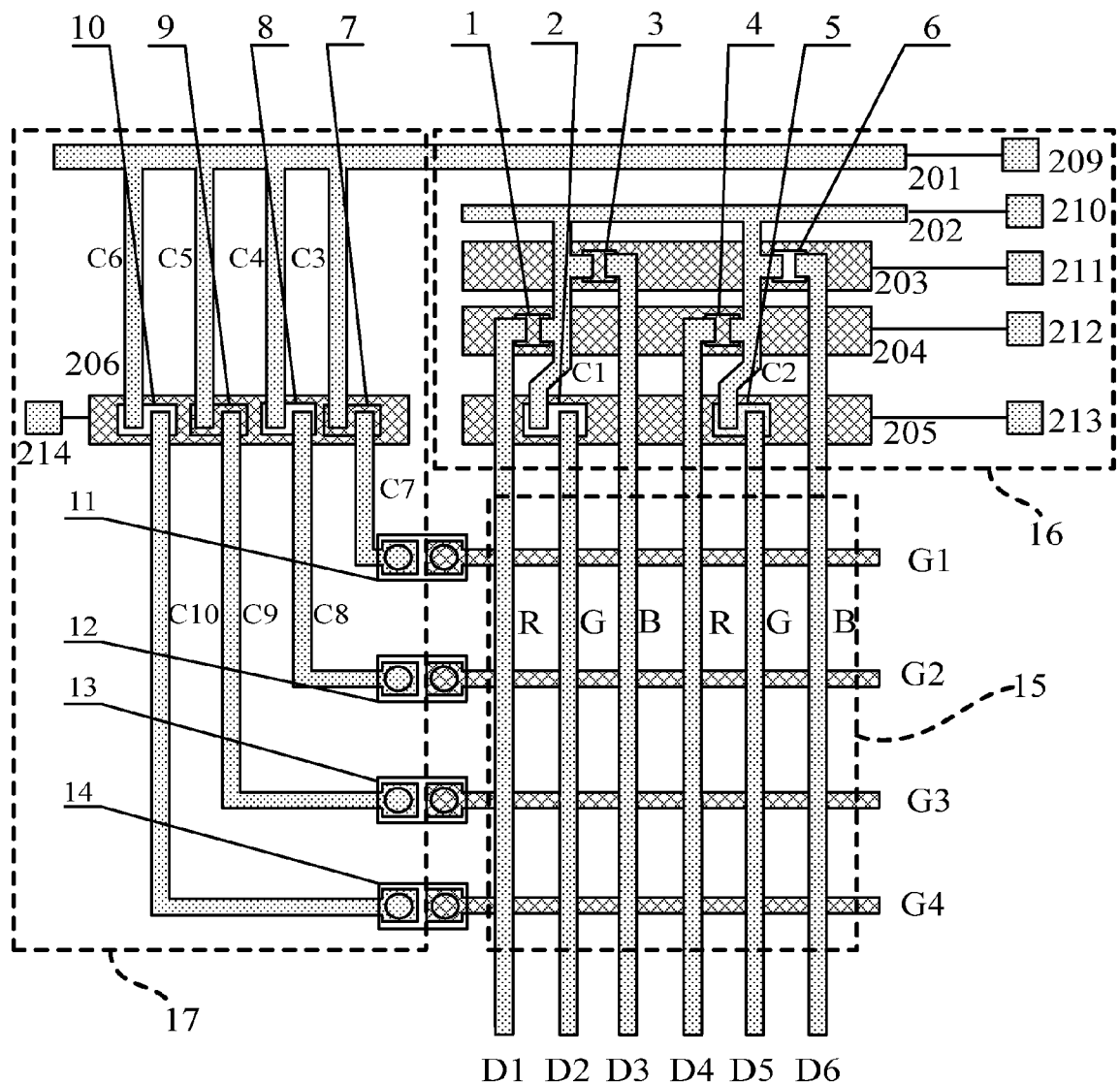
FIG. 2 is a structural schematic diagram of a detection device of a liquid crystal display device provided by an embodiment of the present invention.

Referring to FIG. 2, FIG. 2 is a structural schematic diagram of a test device for a liquid crystal display device provided by an embodiment of the present invention. In FIG. 2, a display region 15 is shown, the other region except the display region 15 is a non-display region, the non-display region includes a data line test region 16 and a scanning line test region 17.

The display region 15 in the embodiment of the present invention includes four scanning lines G1, G2, G3, G4 and six data lines D1, D2, D3, D4, D5, and D6. It should be noted that only six data lines and four scanning lines are used in the embodiment for describing concisely, but this will not intended to limit the present invention. The fourth scanning lines G1, G2, G3, G4 are in parallel with each other and spaced away in a fixed spacing, which extend in the row direction of the pixel matrix of the liquid crystal display device; the six data lines D1, D2, D3, D4, D5, D6 are in parallel with each other and spaced away in a fixed spacing, which extend in the direction perpendicular to the scanning lines G1, G2, G3, G4. The intersecting portions of the data lines D1, D2, D3, D4, D5, D6 and the scanning lines G1, G2, G3, G4 define multiple pixel regions, each of them has a pixel electrode, and the pixel electrode is connected with a Thin Film Transistor (TFT). The TFT can be turned on by controlling the signal of the scanning line, to transmit a signal from a corresponding data line to a corresponding pixel electrode, so as to control the orientation of liquid crystal molecules to display one of red color, green color and blue color, or a combination thereof. In the embodiment, the data lines D1 and D4 are connected to pixel electrodes R for displaying red color, the data lines D2 and D5 are connected to pixel electrodes G for displaying green color, and the data lines D3 and D6 are connected to pixel electrodes B for displaying blue color.

In the embodiment, the data line test region 16 includes a first shorting loop, three control lines and six switch elements 1, 2, 3, 4, 5, 6.

Particularly, the first shorting loop includes a first shorting bar 202, a first transmission line C1 and a second transmission line C2. One end of the first shorting bar 202 is connected with a test terminal 210. The first transmission line C1 and the second transmission line C2 are directly connected with the first shorting bar 202 respectively, i.e. the first transmission line C1 and the second transmission line C2 as well as the first shorting bar 202 are formed in one step according to the design. In the embodiment, the first shorting loop (i.e. the first shorting bar 202, the first transmission line C1 and the second transmission line C2) and the six data lines D1, D2, D3, D4, D5, D6 are made of the same material, and are formed by synchronously film forming and etching in manufacturing process of the liquid crystal display panel.

The three control lines are a first control line 203, a second control line 204 and a third control line 205. One end of each control line is connected with a test terminal. Specifically, one end of the first control line 203 is connected with a test terminal 211, one end of the second control line 204 is connected with a test terminal 212, and one end of the third control line 205 is connected with a test terminal 213.

The six switch elements 1, 2, 3, 4, 5, 6 are divided into two groups, one group is connected to the first transmission line C1, the other group is connected to the second transmission line C2. Specifically, the first transmission line C1 is connected with the data lines D1, D2 and D3 respectively via the switch elements 1, 2, 3; and the second transmission line C2 is connected with the data lines D4, D5 and D6 respectively via the switch elements 4, 5, 6. Furthermore, the switch elements 3 and 6 are connected on the first control line 203 to control the switch elements 3 and 6 on/off under a control signal inputted on the test terminal 211 of the first control line 203. Similarly, the switch elements 1 and 4 are connected on the second control line 204 to control the switch elements 1 and 4 on/off by the second control line 204; and the switch elements 2 and 5 are connected on the third control line 205 to control the switch elements 2 and 5 on/off by the third control line 205. The switch elements 1, 2, 3, 4, 5, 6 in the embodiment are all the thin film transistor switch elements.

The scanning line test region 17 includes a second shorting loop, a control line 206, four switch elements 7, 8, 9, 10 and four pairs of via holes 11, 12, 13, 14.

Particularly, the second shorting loop includes a second shorting bar 201, four transmission lines C3, C4, C5, C6 connected directly with the second shorting bar 201, and four transmission lines C7, C8, C9, C10 connected indirectly with the second shorting bar 201. One end of the second shorting bar 201 is connected with the test terminal 209, and the second shorting bar 201 and the test terminal 209 extend into the data line test region 16. The four transmission lines C7, C8, C9, C10 connected indirectly with the second shorting bar 201 are respectively connected to the four transmission lines C3, C4, C5, C6 connected directly with the second shorting bar 201 via four switch elements 7, 8, 9, 10. The four switch elements 7, 8, 9, 10 are also connected with the control line 206, one end of the control line 206 is connected with the test terminal 204 to control the switch elements 7, 8, 9, 10 on/off by a control signal inputted on the test terminal 214. The four transmission lines C7, C8, C9, C10 connected indirectly with the second shorting bar 201 are connected with four scanning lines G1, G2, G3, G4 respectively via the four pairs of via holes 11, 12, 13, 14.

Figure 3:
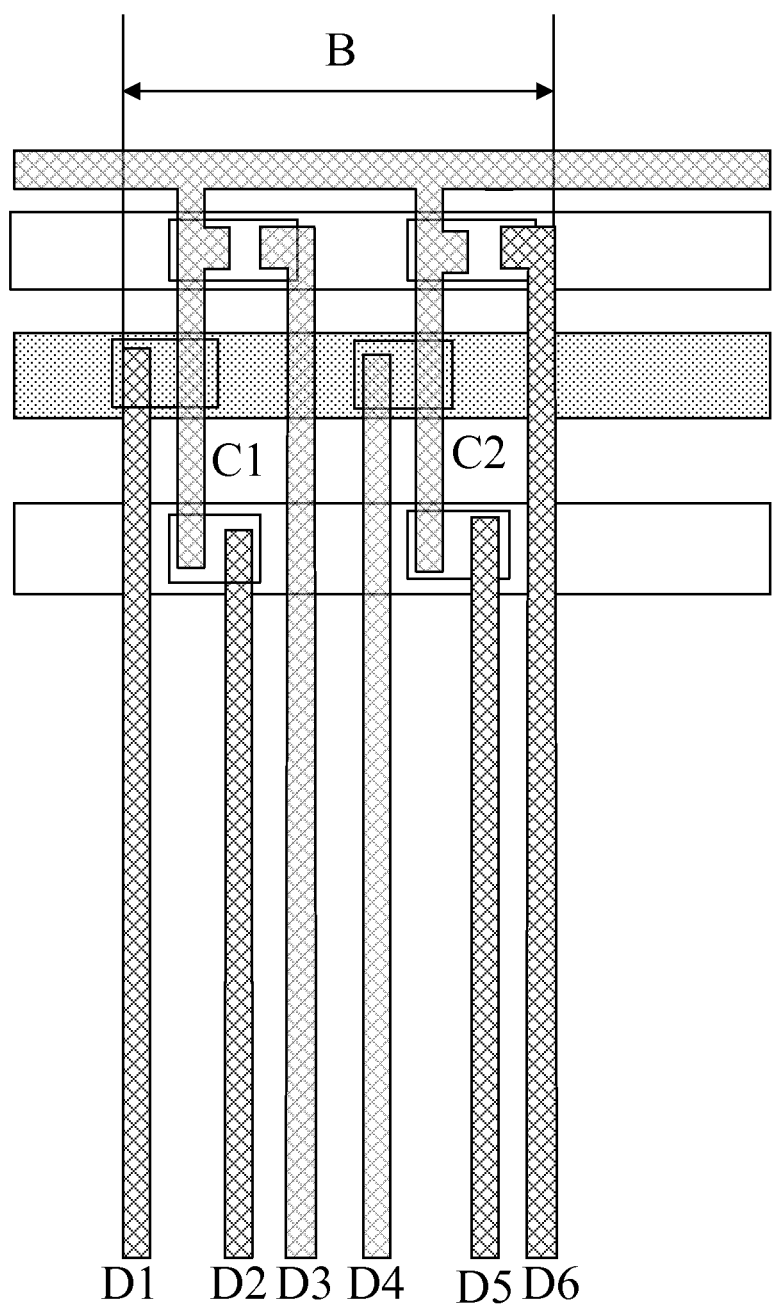
FIG. 3 is an enlarged structural schematic diagram of the detection device in FIG. 2.

Referring to FIG. 3, FIG. 3 is an enlarged partial structural schematic diagram of the data line test region 16 in FIG. 2. The present invention adopts a new design in which three adjacent data lines are connected with the first shorting bar via only one transmission line (i.e. the first transmission line C1 or the second transmission line C2), each transmission line is arranged with three switch elements for connecting the three data lines, and the three data lines connected with the same transmission line respectively correspond to a red pixel electrode, a green pixel electrode and a blue pixel electrode. Furthermore, the present invention designs three control lines, each of them is arranged with two switch elements, the data lines corresponding to the two switching elements on the same control line correspond to pixel electrodes with a same color. In this way, colors such as red, green, blue, black, white or gray can be displayed on the display region by applying corresponding control signals to three control lines. It can be seen from FIG. 3 that six data lines D1, D2, D3, D4, D5, D6 are connected with the first transmission line C1 and the second transmission line C2 in the embodiment of the present invention. Therefore, compared with the structure of the prior art in which each data line requires a connection line and a shorting bar, the space occupied by the data line test region in the present invention is decreased.

Figure 1:
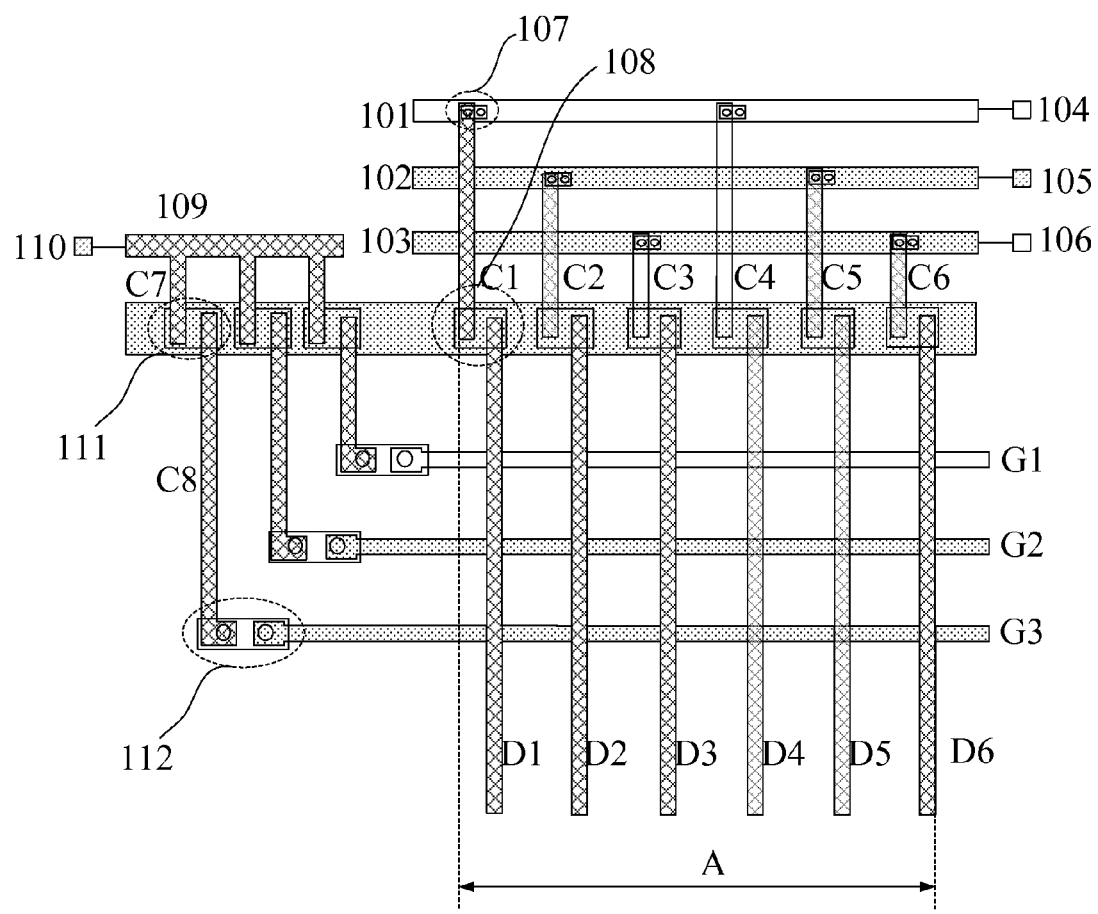
FIG. 1 is a structural schematic diagram of a detection device of a liquid crystal display device provided by the prior art.
Figure 4:
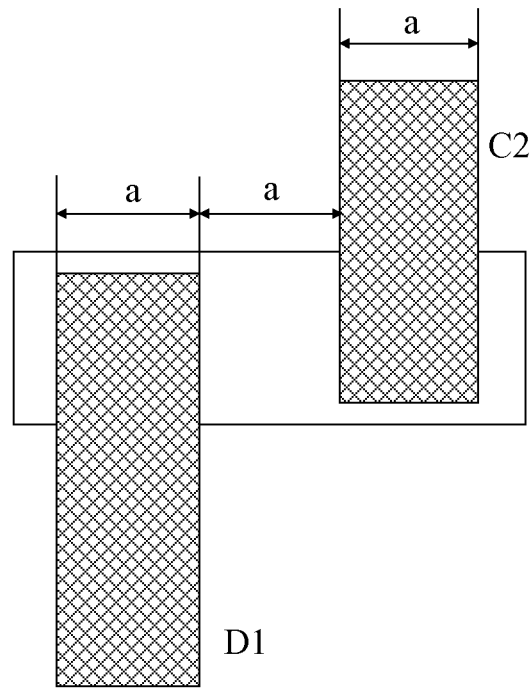
FIG. 4 is a structural schematic diagram showing a data line, a transmission line and the width therebetween in FIG. 1.

Referring to FIG. 4, FIG. 4 is a structural schematic diagram showing a data line, a transmission line and the width there between in FIG. 1. In FIG. 4, the widths of the data line D1 and the second transmission line C2 are a, and the width of the gap between the data line D1 and the second transmission line C2 is also equal to a. Similarly, the widths of other data lines and transmission lines, the distance between the data line and the transmission line adjacent with each other are equal to a, and thus the distance A from the first transmission line C1 to the data line D6 in FIG. 1 is equal to 23a. Referring to FIG. 3, if the widths of each data line and each transmission line as well as the distance between the data line and the transmission line adjacent with each other are all equal to a, the distance B from the data line D1 to the data line D6 is equal to 15a. Therefore, compared with the prior art, in the liquid crystal display device provided by the present invention, the space of the data line test region is decreased by A−B=8a, which facilitates the production of a small size liquid crystal display device. Also, the saved space can be used to increase the size of the thin film transistor switch, so that the thin film transistor switch has a large ON state current, and thus the display characteristic is improved.

It can be seen from the embodiment that, in the test structure for the liquid crystal display device provided by the present invention, according to a new design, the first shorting bar, the first transmission line and the second transmission line are formed in one process step, and the first transmission line and the second transmission line are directly connected with the first shorting bar without the via hole, thus eliminating the bad effect caused by the via holes during the testing process. Furthermore, in the test structure for the liquid crystal display device provided by the present invention, compared with the prior art, the number of the transmission lines is decreased due to three adjacent data lines connected through one transmission line, and thus the space of the data line test region is decreased, which facilitates the production of a small size liquid crystal display device. The saved space can be used to increase the size of the thin film transistor switch, so that the thin film transistor switch has a larger ON state current, and thus the display characteristic is improved.

It should be noted that although the technical improvement is only described for the data line testing region, the same technique can also be used in the scanning line test region to achieve the purposes of eliminating via holes and saving the spacing of the scanning line testing region. At this point, the present invention has no been limited, and all embodiments obtained by those skilled in the art without creative work fall within the scope of protection of the present invention.

A Second Embodiment

In the first embodiment, the six data lines and the three control lines have intersecting portions with larger areas, which will lead to a signal transmission delay during the transmission of a test signal or a control signal, and will slower the response speed of the testing results. In view of this, a new design is provided in the embodiment to decrease the area of the intersecting portion of the data line and the control line, so as to facilitate the transmission of signals and improve response speed.

Figure 5:
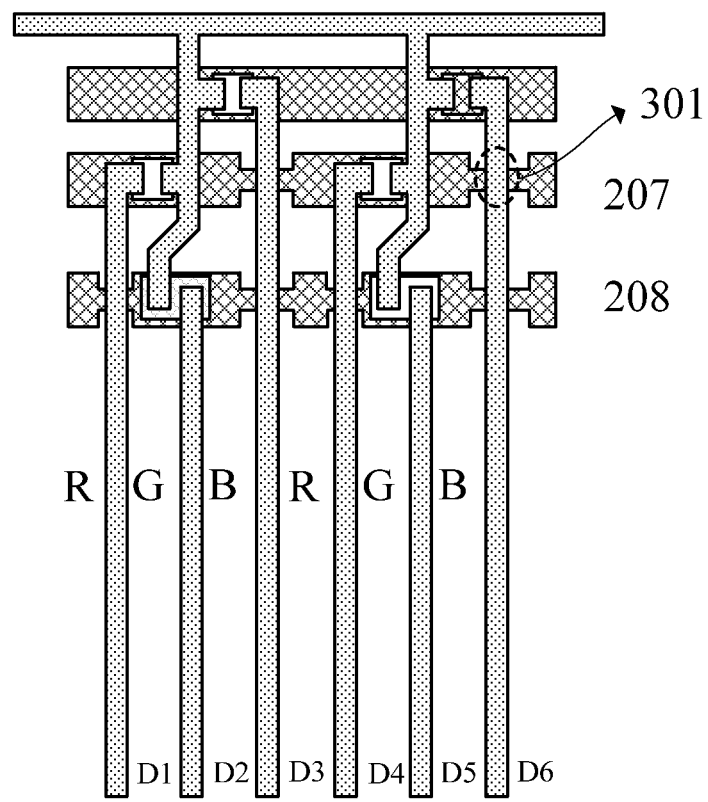
FIG. 5 is a partial structural schematic diagram of another detection device of a liquid crystal display device provided by an embodiment of the present invention.

Referring to FIG. 5, FIG. 5 is a partial structural schematic diagram of another test device for a liquid crystal display device provided by the embodiment of the present invention. On the basis of FIG. 2, in the embodiment, the width of the second control line 207 at the intersecting portions 301 of the second control line 207 and the data lines D3, D6 is designed to be smaller than the width of the second control line 207 at non-intersecting portions, the width of the third control line 208 at intersecting portions of the third control line 208 and the data lines D1, D3, D4, D6 is designed to be smaller than the width of the third control line 208 at non-intersecting portions. The data lines D2 and D5 are connected with the third control line 208 via corresponding switch elements, and there is not the situation that a data line and a control line are intersected to each other, thereby the above modification is unnecessary. Similarly, the above modification is not required when the data line and the control line are connected via corresponding switching elements. Other structures of the liquid crystal display device in the embodiment are the same as that in the second embodiment, which will not be described in detail herein.

In the embodiment, the width of the control line at the intersecting portion (i.e. the intersecting portions without a switching element) of the control line and the data line is designed to be smaller than the width of the control line at non-intersecting portions. In this way, the area of the intersecting portion between the control line and the data line is decreased effectively, and the parasitic capacitance between the control line and the data line is decreased, so as to reduce signal interference, facilitate the transmission of signals, improves response speed and decreases testing power consumption.

It should be noted that the embodiment is described based on the data line testing region. If the illustration is based on the scanning line testing region, the width of the control line at intersecting portions of the control line and the scanning line is designed to be less than the width of the control line at non-intersecting portions.

A Third Embodiment

Referring to FIG. 2, in the testing process for a liquid crystal display device in the first embodiment, it is required to input corresponding testing signals or control signals to the test terminals 209, 210, 211, 212, 214 (referring to FIG. 2). It can be seen from FIG. 2 that, the test terminal 214 of the control line 206 in the scanning line test region 17 is located at a different side from the five test terminals 209, 210, 211, 212, 213 in the data line test region 16, this structure leads to a larger occupied space of the non-display region (including the data line test region 16 and the scanning line test region 17).

Based on those, the embodiment provides a new design, so as to decrease the number of test terminals, and locate all the test terminals at the same side so that the occupied space of the non-display region is decreased.

Figure 6:
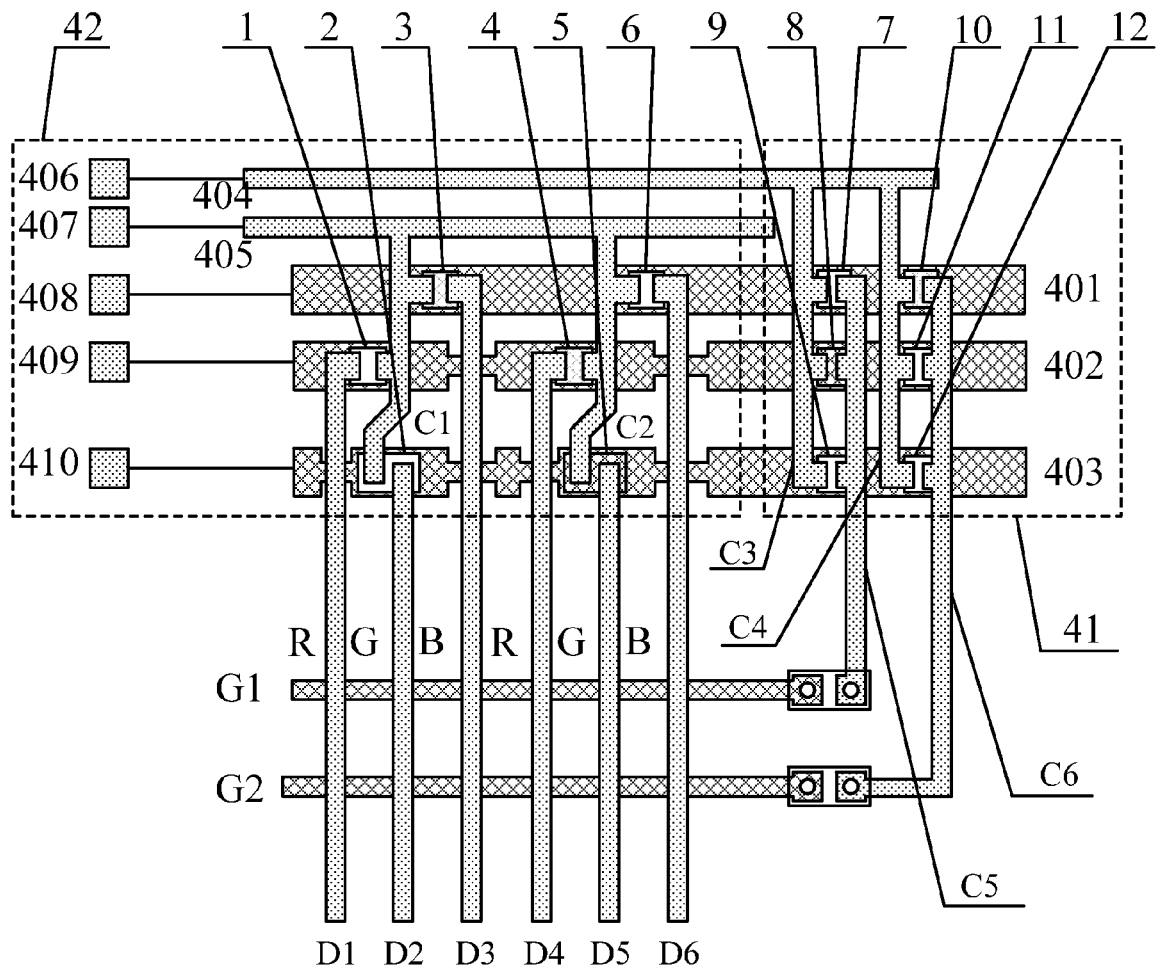
FIG. 6 is a structural schematic diagram of yet another detection device of a liquid crystal display device provided by an embodiment of the present invention.

Referring to FIG. 6, FIG. 6 is a structural schematic diagram of another test device for a liquid crystal display device provided by the embodiment of the present invention. For describing briefly, the embodiment is illustrated based on two scanning lines and six data lines, but not limit to this. The liquid crystal display device in the embodiment includes a display region (not marked in figure), a data line test region 42 and a scanning line test region 41.

Particularly, the display region includes two scanning lines G1 and G2, and six data lines D1, D2, D3, D4, D5, and D6 arranged perpendicular to the scanning lines.

The data line test region 42 includes: a first shorting loop including a first shorting bar 405, a first transmission line C1, a second transmission line C2, and a test terminal 407 connected to one end of the shorting bar 405; three control lines 401, 402, 403 and test terminals 408, 409, 410 connected respectively with the three control lines; and six switch elements 1, 2, 3, 4, 5, 6. The connecting structure of each component in the data line test region 42 is the same as that in the first embodiment, which will not be described in detail herein.

The difference between the embodiment and the first embodiment is the connecting structure of the components in the scanning line test region 41. The scanning line test region 41 includes a second shorting loop and six switch elements 7, 8, 9, 10, 11, 12, and the scanning line test region 41 share the three control lines with the data line test region 42.

Particularly, the second shorting loop includes a second shorting bar 404, a third transmission line C3, a fourth transmission line C4, a fifth transmission line C5 and a sixth transmission line C6. The second shorting bar 404 extends to the data line test region 42, one end of the second shorting bar 404 is connected with a test terminal 406, and the test terminal 406 is located at the same side with the test terminals 407, 408, 409, 410 in the data line test region 42. The third transmission line C3 and the fourth transmission line C4 are directly connected with the second shorting bar 404, the third transmission line C3 is connected with the fifth transmission line C5 via the switch elements 7, 8, 9, and the fourth transmission line C4 is connected with the sixth transmission line C6 via the switch elements 10, 11, 12. The first control line 401 is connected with the switch elements 7 and 10 to control the switch elements 7 and 10 on/off; the second control line 402 is connected with the switch elements 8 and 11 to control the switch elements 8 and 11 on/off; and the third control line 403 is connected with the switch elements 9 and 12 to control the switch elements 9 and 12 on/off. The fifth transmission line C5 and the sixth transmission line C6 are connected with the scanning lines G1 and G2 respectively through the via holes.

In a specific testing process, test signals are inputted into the test terminals 406 and 407. When the test terminal 408 has a low voltage and the test terminals 409 and 410 have a high voltage, the switch elements 3, 6, 7, 10 connected with the first control line 401 are turned off, and the switch elements connected with the second control line 402 and the third control line 403 are turned on. As a result, in the scanning line test region 41, the test signal on the second shorting bar 404 is transmitted from the third transmission line C3 to the fifth transmission line C5 via the switch elements 8 and 9, and then is transmitted from the fifth transmission line C5 to the scanning line G1 by the via holes. At the same time, the test signal on the second shorting bar 404 is transmitted from the fourth transmission line C4 to the sixth transmission line C6 via the switch elements 11, 12, and then is transmitted from the sixth transmission line C6 to the scanning line G2 by the via holes. In the data line test region 42, the test signal on the first shorting bar 405 is transmitted from the transmission lines C1 and C2 to the data lines D1, D2 and D4, D5 respectively via switch elements 1, 2 and 4, 5, so that the four data lines control the deflection of their corresponding liquid crystal molecules to block red light and green light; accordingly, the data lines D3 and D6 control corresponding liquid crystal molecules not to be deflected, so that the blue light can pass through to display a blue image on the display region. Similarly, when the test terminal 409 has a low voltage and the test terminals 408 and 410 have a high voltage, a red image can be displayed on the display region; when the test terminal 410 has a low voltage and the test terminals 408, 409 have a high voltage, a green image can be displayed on the display region; when all the test terminals 408, 409 and 410 have a high voltage, an image with different colors such as black, white or gray can be displayed on the display region by controlling the test signal on the test terminal 407.

As known from the above, the scanning line test region shares three control lines with the data line test region, therefore in the scanning line test region, the test signal on the second shorting bar 404 can be transmitted to the scanning lines G1 and G2, as long as one of the test terminals 408, 409 and 410 has a high voltage. Therefore, compared with the two above embodiments, the control line 206 for separately controlling the scanning line testing signal and the corresponding test terminals are removed in this embodiment (referring to FIG. 3), so as to decrease the space occupied by the non-display region and facilitate the production of a small size liquid crystal display device. The saved space can be used to increase the size of the thin film transistor switch, so as to increase the ON state current of the thin film transistor switch and improve the display characteristics.

In the embodiment, based on the first embodiment and the second embodiment, the scanning line test region is designed to share three control lines with the data line test region, so that the scanning line testing signals can be transmitted to the scanning lines in scanning line test region while the data line testing signal is transmitted in the data line test region. Thus, the control lines for separately controlling the transmission of the scanning line test signal and the corresponding test terminal are removed, so as to save the space occupied by the non-display region and facilitate the production of a small size liquid crystal display device. In addition, the saved space can be used to increase the size of the thin film transistor switch, so as to increase the ON state current of the thin film transistor switch and improve the display characteristics.

The present invention also provides a test method of a test device for a liquid crystal display device.

A Fourth Embodiment

The test method provided by the present invention is described in detail in conjunction with the test device for a liquid crystal display device shown in FIG. 2.

The test method includes the following steps.

Step S1: providing a control signal of a high voltage for the control lines to detect the scanning lines and the shorting bar connected with the scanning lines in the test device.

Specifically, a control signal of a high voltage (e.g. 15V) is provided to the control line 206 connected with the scanning lines G1, G2, G3 and G4 via the test terminal 214, so that the switch elements 7, 8, 9, 10 on the control line 206 are turned on. A control signal of a high voltage (e.g. 15V) is provided to the second shorting bar 201 via the test terminal 209, and is transmitted to the corresponding scanning line G4 via the transmission line C6, the switching element 10, the transmission line C10, and the via hole 14. In addition, other scanning lines G1, G2, G3 receive the control signal of the high voltage from the second shorting bar 201 via their corresponding transmission lines, switch elements and via holes.

Step S2: providing a control signal of a high voltage for the control lines to detect data lines in the test device.

A control signal of a high voltage (e.g. 15V) is provided to the first control line 203 connected with the data lines D3 and D6 via the test terminal 211, so that the switch elements 3 and 6 on the first control line 203 are turned on; while a control signal of the high voltage is provided to the second control line 204 and the third control line 205 respectively, so that the switch elements 1, 2, 4, 5 are turned on.

Step S3: providing a voltage signal for the shorting bars connected with the data lines in the test device to insert a white image.

A voltage signal, which approximates to the voltage signal of the common electrode, is provided for the first shorting bar 202 via the test terminal 210 to display a white image. The voltage signal is transmitted to the data line D3 via the first transmission line C1 and the switch element 3, and other data lines D1, D2, D4, D5, D6 receive the voltage signal from the first shorting bar 202 via their corresponding transmission lines and switch elements. A white image is displayed on the display region 15 since the data lines D1, D2, D3, D4, D5, and D6 have the same voltage signal.

Step S4: adjusting the voltage signal on the shorting bar connected with the data lines in the test device, or adjusting the control signals for detecting the data lines in the test device, and displaying images with different colors on the display region to detect defects.

The step includes the following situations:

A first situation: detecting a red image by the following steps: providing a high voltage to the control lines connected with the scanning lines and the second shorting bar in the test device, so that all the thin film transistors in the display region are turned on; providing a control signal of a low voltage to the second control line corresponding to the data lines of the red pixel electrodes R in the test device, providing a voltage signal to the first control line corresponding to the data lines of the blue pixel electrodes B and the third control line corresponding to the data lines of the green pixel electrodes G in the test device; providing a display signal to the first shorting bar in the test device, so as to display a red image and detect whether there is the line defect in the scanning lines corresponding to the red pixel electrodes R.

Specifically, the control signal of the low voltage (e.g. −10V) is provided to the second control line 204 via the test terminal 212, the signal of the high voltage is provided to the first control line 203 and the third control line 205 respectively via the test terminals 211, 213, and a voltage signal of 5V is provided to the first shorting bar 202 via the test terminal 210. Because the control signal of the low voltage cause the switch elements 1 and 4 on the second control line 204 to be in a cut-off state, the voltage signal of 5V on the first shorting bar 202 can not be transmitted to the data lines D1 and D4 via corresponding transmission lines and switch elements, so that liquid crystal molecules corresponding to the data lines D1 and D4 are not deflected, and the light from the red pixel electrodes R can pass through a crystal liquid layer. Since the control signal on the first control line 203, the control signal on the third control line 205 and the control signal on the control line 206 have a high voltage (e.g. 15V), the liquid crystal molecules corresponding to the data lines D2, D3, D5 and D6 is deflected to prevent the light from the green pixel electrodes G and the blue pixel electrodes B passing through the liquid crystal layer. Therefore, a red image is displayed on the display region 15. In this case, the red image can be detected to whether there is the line defect in the scanning line corresponding to the red pixel electrodes R.

A second situation: detecting a green image by the following steps: providing a high voltage to the control lines connected with the scanning lines and the second shorting bar in the test device, so that all the thin film transistors in the display region are turned on; providing a control signal of a low voltage to the third control line corresponding to the data lines of the green pixel electrodes G in the test device, and providing a voltage signal to the first control line corresponding to the data lines of the blue pixel electrodes B and the second control line corresponding to the data lines of the red pixel electrodes R in the test device; providing a display signal to the first shorting bar in the test device, so as to display a green image and detecting whether there is the line defect in the scanning lines corresponding to the green pixel electrodes G.

Specifically, the control signal of the low voltage (e.g. −10V) is provided to the third control line 205 via the test terminal 213, a signal of a high voltage is provided to the first control line 203 and the second control line 204 via the test terminals 211, 212 respectively, and a voltage signal of 5V is provided to the first shorting bar 202 via the test terminal 210. As a result, a green image is displayed on the display region 15. In this case, the green image can be detected for determining whether there is the line defect in the scanning line corresponding to the green pixel electrodes G.

A third situation: detecting a blue image by the following steps: providing a high voltage to the control lines connected with the scanning lines and the second shorting bar in the test device, so that all the thin film transistors in the display region are turned on; providing a control signal of a low voltage to the first control line corresponding to the data lines of the blue pixel electrodes B in the test device, and providing a voltage signal to the third control line corresponding to the data lines of the green pixel electrodes G and the second control line corresponding to the data lines of the red pixel electrodes R in the test device; providing a display signal to the first shorting bar in the test device, so as to display a blue image and detect whether there is the line defect in the scanning line corresponding to the blue pixel electrodes B.

Specifically, the control signal of the low voltage (e.g. −10V) is provided to the first control line 203 via the test terminal 211, the signal of the low voltage is provided to the second control line 204 and the third control line 205 via the test terminals 212, 213 respectively, and the voltage signal of 5V is provided to the first shorting bar 202 via the test terminal 210, so as to display a blue image on the display region 15 and detect the blue image to determine whether there is the line defect in the scanning lines corresponding to the blue pixel electrodes B.

The fourth situation: detecting a black image by the following steps: providing a high voltage to the control line connected with the scanning lines and the second shorting bar in the test device, so that all the thin film transistors in the display region are turned on; providing a high voltage to the first, the second and the third control line connected with the data lines in the test device; providing a first display signal to the first shorting bar in the test device, so as to display a black image and detect whether there is the line defect in the black image.

Specifically, a signal of a high voltage is provided to the first control line 203, the second control line 204 and the third control line 205 via the test terminals 211, 212 and 213 respectively; and a voltage signal of 5V is provided to the first shorting bar 202 connected with the data lines via the test terminal 210, so as to display a black image on the display region 15 and detect whether there is the line defect in the data lines.

The fifth situation: detecting a gray image by the following steps: providing a high voltage to the control lines connected with the scanning lines and the second shorting bar in the test device, so that all the thin film transistors in the display region are turned on; providing a high voltage to the first, the second and the third control line connected with the data lines in the test device; and providing a second display signal to the first shorting bar in the test device, so as to display a gray image and detect whether there is the line defect in the gray image.

Specifically, a signal of a high voltage is provided to the first control line 203, the second control line 204 and the third control line 205 via the test terminals 211, 212, 213, and a voltage signal of 2.5V is provided to the first shorting bar 202 connected with the data lines via the test terminal 210, so as to display a gray image on the display region 15 and detect whether there is the line defect in the data lines.

For the above situations, when it is required to switch between the red image, the green image and the blue image, for example, when a red image need to be switched into a green image, firstly a control signal of a high voltage (e.g. 15V) is provided to the second control line 204, a high voltage such as 5V is provided to the test terminal 210, and in this case a black image is displayed on the display region 15; next, a low voltage is provided to the first control line 203 and the second control line 204; then a control signal of a high voltage (e.g. 15V) is provided to the third control line 205, and at the same time a low voltage is provided to the test terminal 210, in this case a green image is displayed on the display region 15. As a result, the red image is switched to the green image. The switching between the red, green, blue images is implemented in the same manner, which will not be described in detail herein.

When a black (or gray) image is switched into a red (green or blue) image, the Step S3 is firstly performed, i.e. a white image is firstly displayed in the display region 15, then the steps corresponding to the first situation, the second situation or the third situation in the Step S4 can be performed, to switch the black (or gray) image into the red (green or blue) image.

When it is required to a switch between a black image and a gray image, the switch can be achieved by only adjusting the voltage signal of the shorting bars connected with the data lines in the test device.

When a red (green or blue) image is switched into a black (or gray) image, for example, when a red image is switched into a black image, the switching can be achieved by only providing a control signal of a high voltage (e.g. 15V) to the second control line 204 and providing a low voltage of 5V to the first shorting bar 202; when a red image is switched into a gray image, the switching can be achieved by providing a control signal of a high voltage (e.g. 15V) to the second control line 204 and providing a voltage signal of 2.5V to the first shorting bar 202. The switching between other color images is similar with the above.

From the above, in the test method of the test device for a liquid crystal display device provided by the embodiment, a red, green, blue, black, white or gray image can be displayed on the display region for the purpose of detection, by applying a control signal with a predetermined voltage on the test terminals. Since the test device of a liquid crystal display device in this test method is shown in FIG. 2 in which via holes are eliminated, there is not the line defect in the scanning lines or data lines which are caused by the via holes, thus improving the testing efficiency.

A Fifth Embodiment

In the test device for a liquid crystal display device shown in FIG. 6, the first shorting bar and the second shorting bar are connected with the data lines and scanning lines by the same three control lines. Specifically, the second shorting bar 404 for transmitting signals to the scanning lines and the first shorting bar 405 for transmitting signals to the data lines are connected with the scanning lines and the data lines respectively via the first control line 401, the second control line 402 and the third control line 403. The three control lines can separately control the first shorting bar 405 or the second shorting bar 404 to transmit signals to the data lines or the scanning lines; in addition, all the three control lines can be connected to a low voltage so that the switches on the control lines are turned off, or be connected to a high voltage so that the switches on the control lines are turned on to control the transmission of the signals on the first shorting bar 405 and the second shorting bar 404.

In the test method corresponding to the test device shown in FIG. 6, by providing a control signal of a high voltage to the control lines for detecting the data lines in the test device, not only the transmission of control signals to the data lines is achieved, but also the transmission of control signals to the scanning lines is achieved. The other steps of the test method of the test device shown in FIG. 6 are the same as that of the above embodiment, except that the Step S1 (i.e. providing a control signal of a high voltage for the control lines to detect the scanning lines in the detection device) and the Step S2 (i.e. providing a control signal of a high voltage for the control lines to detect the data lines in the detection device) are combined into one step, which simplifies the detecting method. The other steps are similar with that in the above embodiment, and can be inferred with reference to the test method provided in the above embodiment and the test device shown in FIG. 6, which will not be described in detail herein.

In the test method of the test device provided in FIG. 6, the step of providing a control signal of a high voltage for the control lines to detect the scanning lines is omitted, thus improving the testing efficiency. In addition, since the test method provided in the embodiment is described based on the test device for a liquid crystal display device shown in FIG. 6, there is not the problem of line defect of the data lines or scanning lines caused by via holes, and the testing result will not be affected by the via holes.

The embodiments of the present invention are described herein in a progressive manner, with the emphasis of each of the embodiments on the difference between it and the other embodiments; hence, for the same or similar parts between the embodiments, one can refer to the other embodiments.

It should be noted that terminologies such as "a first", "a second", "the first", "the second" herein are just used in distinguishing one entity or operation from another entity or operation, and are not bound to require or imply any kind of the actual relationship or sequence existing between these entities and operations. Moreover, terminologies "include", "comprise" or any other variations are intended to cover all nonexclusive containing, such that a process, method, article, or equipment including a series of elements includes not only the listed elements, but also other elements not listed specifically, or includes the inherent elements thereof. Without more restrictions, the element defined by the sentence "including/comprising a . . . " does not exclude that the process, method, article, or equipment includes more than one of that element.

The above description of the disclosed embodiments enables those skilled in the art to implement or utilize the present invention. It will be apparent for those skilled in the art to modify the embodiments in various ways. The general principles defined herein can be implemented in other embodiments without departing from the spirit and the scope of the present invention. Therefore, the present invention is not limited by these embodiments shown herein, but includes the broadest scope consistent with the principles and the novelty features disclosed herein.

The invention claimed is:

1. A test device for a liquid crystal display device, the liquid crystal display device comprising a plurality of scanning lines and a plurality of data lines that intersect perpendicularly, and a plurality of pixel units defined by the plurality of scanning lines and the plurality of data lines, the pixel units comprising red pixel units, green pixel units and blue pixel units;

the test device comprising a data line test means, wherein the data line test means comprises a first shorting bar, a first control line, a second control line, a third control line, a plurality of transmission lines and a plurality of thin film transistor switch elements; wherein gate electrodes of the plurality of thin film transistor switch elements of the data line test means are respectively arranged on the first control line, the second control line and the third control line;

the plurality of data lines are respectively connected to the first control line, the second control line and the third control line via drain electrodes of the plurality of thin film transistor switch elements, wherein all the data lines for controlling the blue pixel units are connected to the first control line, and all the data lines for controlling the red pixel units are connected to the second control line, and all the data lines for controlling the green pixel units are connected to the third control line; and source electrodes of the plurality of thin film transistor switch elements of the data line test means are respectively connected to the first shorting bar via a plurality of transmission lines.

2. The test device for the liquid crystal display device according to claim 1, wherein three thin film transistor switch elements of the data line test means, which are connected with the data lines of three adjacent pixel units, have the source electrodes connected to the first shorting bar via a same transmission line.

3. The test device for the liquid crystal display device according to claim 2, wherein the three adjacent pixel units are a red pixel unit, a green pixel unit and a blue pixel unit adjacent with each other.

4. The test device for the liquid crystal display device according to claim 1, further comprising a scanning line test means comprising a second shorting bar, a fourth control line, a plurality of transmission lines and a plurality of thin film transistor switch elements; wherein the gate electrodes of the plurality of thin film transistor switch elements of the scanning line test means are arranged on the fourth control line; and the plurality of scanning lines are connected to the fourth control line respectively via drain electrodes of the plurality of thin film transistor switch elements of the scanning line test means, and the source electrodes of the plurality of thin film transistor switch elements of the scanning line test means are connected to the second shorting bar respectively via a plurality of transmission lines.

5. The test device for the liquid crystal display device according to claim 1, further comprising a scanning line test means comprising a second shorting bar, a plurality of transmission lines and a plurality of thin film transistor switch elements; wherein the gate electrodes of the plurality of thin film transistor switch elements of the scanning line test means are respectively arranged on the first control line, the second control line and the third control line; and the drain electrode of one thin film transistor switch element of the scanning line test means on the first control line, the drain electrode of one thin film transistor switch element of the scanning line test means on the second control line, and the drain electrode of one thin film transistor switch element of the scanning line test means on the third control line are connected to a same scanning line, and the source electrodes of which are connected to the second shorting bar via a same transmission line.

6. The test device for the liquid crystal display device according to claim 1, wherein a width of the second control line at intersecting portion of the second control line and the data line is smaller than the width of the second control line at non-intersecting portion.

7. The test device for the liquid crystal display device according to claim 1, further comprising a test terminal connected to the first control line, a test terminal connected to the second control line and a test terminal connected to the third control line.

8. The test device for the liquid crystal display device according to claim 1, further comprising a test terminal connected to the first shorting bar.

9. The test device for the liquid crystal display device according to claim 1, wherein the first shorting bar, the source electrodes and the drain electrodes of the plurality of thin film transistor switch elements of the data line test means, and the plurality of data lines are made of the same material, and are formed synchronously.

10. The test device for the liquid crystal display device according to claim 4, further comprising a test terminal connected to the second shorting bar.

11. The test device for the liquid crystal display device according to claim 5, further comprising a test terminal connected to the second shorting bar.

12. The test device for the liquid crystal display device according to claim 4, wherein the drain electrodes of the plurality of thin film transistor switch elements of the scanning line test means are respectively connected to the scanning lines by via holes.

13. The test device for the liquid crystal display device according to claim 5, wherein the drain electrodes of the plurality of thin film transistor switch elements of the scanning line test means are respectively connected to the scanning lines by via holes.

14. The test device for the liquid crystal display device according to claim 4, further comprising a test terminal connected to the fourth control line.

15. The test device for the liquid crystal display device according to claim 5, wherein the first shorting bar, the second shorting bar, the source electrodes and the drain electrodes of the plurality of thin film transistor switch elements of the scanning line test means and the plurality of data lines are made of the same material, and are formed synchronously.

* * * * *